United States Patent Office 3,171,782
Patented Mar. 2, 1965

3,171,782
ORAL COMPOSITIONS COMPRISING LYSOZYME AND VITAMIN $B_6$
Christiane Fellonneau, Paris, France, assignor to Laboratoires de Recherches Experimentales Goulden & Cie, Paris, France
No Drawing. Filed Oct. 24, 1962, Ser. No. 232,854
Claims priority, application France, Oct. 29, 1961, 878,252
4 Claims. (Cl. 167—60)

The present invention relates to pharmaceutically associated compounds. More particularly, it relates to the pharmaceutical association of lysozyme (or globuline G. 1) and vitamin $B_6$ (or pyridoxin).

It is known that lysozyme is a basic protein of uncertain formula and containing 48.7% C, 6.74% H, 17.5% N and 2.3% S. It is obtained from natural vegetable and animal sources and although it is known to have certain physiological actions (such as antibiotic, antivirus or growth factor) the practical results which have been obtained from any attempts at its therapeutic use have never been satisfactory. Furthermore, the clinical efficacy of lysozyme has not been proven nor has its prescriptive field been established.

The formula of vitamin $B_6$ is:

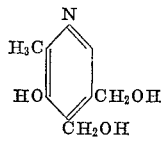

It is also extracted from natural sources, and is used in the prevention and treatment of B-complex deficiencies.

It is an object of this invention to provide novel pharmaceutical compositions for the treatment of aphtha and erosive lichen.

It has been noted that the association of these two compounds in widely varying proportions has a surprising action on certain illnesses of the buccal cavity and, more especially on aphthoses and erosive lichen. This activity is not only more beneficial than that of either of the two compounds taken separately but also better than any forms of treatment used heretofore for the aforesaid illnesses, such as the use of local antibiotics or antiseptics, vitamin therapy and corticotherapy.

The invention essentially consists in a pharmaceutical composition for the treatment of aphtha and erosive lichen comprising lysozyme and vitamin $B_6$.

In practice, the activity of the inventive composition is noted in the association of 0.02 to 0.20 gram of lysozyme with 0.05 to 0.50 gram of vitamin $B_6$. This activity is clearly shown by its effect in early aphthoses having a few red elements and which may perhaps be scattered with a few vesicles, in which case the result is the virtual eradication of the illness, its evolutionary cycle being interrupted. In aphthoses which have already reached an advanced stage with painful ulcerations surrounded by a characteristic carmine border, the effect of the inventive composition is to cause the inflammatory phenomena to rapidly disappear, and to cause epidermization to begin immediately.

The foregoing results are obtained, generally, by a daily dose of approximately 4 to 150 centigrams of lysozyme together with 10 to 400 centigrams of vitamin $B_6$. The dose is preferably administered to provide local treatment of the infected mucosa, whether of the buccal cavity or the rhinopharynx. It may be advantageous to use as the medicamented form of the inventive composition, sublingual tablets and pastilles to be sucked. However, there may be employed all pharmaceutical forms of the composition which permits local impregnation through the association of the two active compounds of the composition such as aerosols and atomized solutions (solutions of 0.02–0.10 g. per ml. of lysozyme and 0.05–0.30 of vitamin $B_6$), toothpaste (having 2% of lysozyme and 5–10% of vitamin $B_6$), or medicated chewing gum (having the same concentration as the pastilles or sublingual tablets).

In a series of clinical tests to enable the assessment of the inventive composition, 50 cases of aphthoses and 10 cases of erosive lichen were treated, distributed as follows:

Aphthoses:
    40 cases cured in from 2 to 3 days;
    5 cases very greatly improved with reduction of pain and more rapid healing;
    5 cases of slighter improvement limited to the decrease of inflammation.

Of these 50 treated cases, 35 had received prior treatment by other forms of therapy which were without effect. Of the latter 35 cases, 12 cases thereof had previously been treated with lysozyme alone, either by general or local administration, with no beneficial effect, and that 7 cases thereof had been treated with large doses of vitamin $B_6$ without any improvement being noted. The foregoing comparison between the inventive composition's effect and that of the constituent compounds thereof used by themselves respectively shows the very great superiority of the lysozyme-vitamin $B_6$ association in the proportions indicated for each one taken separately.

Erosive lichen:
    7 cures
    5 improvements

In this situation, 2 of these cases of erosive lichen had previously been treated by lysozyme alone in doses of 0.30 g. per day for 10 days with no apparent result.

The following further specific examples illustrate the efficacy of the treatment of aphtha and erosive lichen of the inventive composition.

*Example 1.—Mrs. P.*

This patient had recurrent and painful aphthoses. She received numerous local and general therapy treatments which were without effect.

Her taking of the lysozyme-vitamin $B_6$ composition caused her ulcerations to disappear rapidly, and the aphthoses have not reappeared thereafter.

*Example 2.—Mr. I.*

Early aphthoses were exhibited by this patient in the form of a few elements on the gums and the internal surface of the cheeks. His taking of the lysozyme-vitamin $B_6$ medicamented compositions arrested the development of the stomatite aphthoses, and vesicles and ulcerations did not appear.

*Example 3.—Mrs. L.*

This patient showed a growth of stomatite aphthoses with ulcerations covered with a very adhesive and painful fibrous membrane. After 36 hours of treatment with the lysozyme-vitamin $B_6$ composition, it was noted that the inflammatory phenomena had disappeared and the ulcerations began to heal.

*Example 4.—Mrs. B.*

This patient had large ulcerated stomatite aphthoses with added super-infections. Her taking of the lysozyme-vitamin $B_6$ composition relieved the pain and effected a cure within 4 days.

*Example 5.—Mr. J.*

This patient suffered from painful erosive buccal lichen. His taking of the lysozyme-vitamin $B_6$ composition caused progressive relief of the inflammation and cured the ulcerations within approximately 10 days.

I claim:
1. A sublingual tablet, to be sucked, comprising from 0.02 to 0.20 g. of lysozyme and 0.05 to 0.50 g. of vitamin $B_6$.
2. A pharmaceutical solution containing from 0.02 to 0.10 g. per ml. of lysozyme and 0.05 to 0.30 g. per ml. of vitamin $B_6$.
3. A prophylactic dentifrice comprising 2% of lysozyme and from 5 to 10% of vitamin $B_6$.
4. A prophylactic chewing gum containing from 0.02 to 0.20 g. of lysozyme and 0.05 to 0.50 g. of vitamin $B_6$.

References Cited by the Examiner

UNITED STATES PATENTS 2,542,886  2/51  Wach _____ 167—93

FOREIGN PATENTS 1,272,272  8/61  France.

OTHER REFERENCES

Acker et al.: Scientific American, vol. 202, No. 6, pages 132, 134, 136–138, and 140–142 (June 1960).

Fevold: Advances in Protein Chemistry, vol. 6, No. 222, pages 222–232 (1951).

Strean: Dental Abstracts, vol. 3, June 1958, pages 344–345.

Strean: Schweizerische Monatsschrift für Zahnheilkunde, vol. 67, No. 11, November 1957, pages 981–988.

JULIAN S. LEVITT, *Primary Examiner.*

LEWIS GOTTS, *Examiner.*